United States Patent [19]
Morita et al.

[11] Patent Number: 5,473,010
[45] Date of Patent: Dec. 5, 1995

[54] POLYIMIDE BASED RESIN COMPOSITION

[75] Inventors: Atsushi Morita; Tomohito Koba; Toshiaki Takahashi; Katsunori Shimamura; Toshiyuki Kataoka; Hiroyuki Furukawa; Hiroaki Tomimoto, all of Kanagawa, Japan

[73] Assignee: Mitsui Toatsu Chemicals, Inc., Tokyo, Japan

[21] Appl. No.: 297,854

[22] Filed: Aug. 30, 1994

[30] Foreign Application Priority Data

Sep. 1, 1993 [JP] Japan ................................ 5-217156
Dec. 28, 1993 [JP] Japan ................................ 5-335509

[51] Int. Cl.⁶ .................... C08G 73/10; C08L 79/08; C08L 77/00
[52] U.S. Cl. .................. 524/600; 524/606; 528/125; 528/128; 528/170; 528/171; 528/172; 528/173; 528/174; 528/176; 528/185; 528/188; 528/220; 528/229; 528/350; 528/353; 525/432
[58] Field of Search .................... 524/600, 606; 528/350, 229, 170, 353, 220, 185, 128, 188, 125, 171, 172, 173, 174, 176; 525/432

[56] References Cited

U.S. PATENT DOCUMENTS 5,312,866  5/1994  Tsutsumi et al. .................... 524/600

FOREIGN PATENT DOCUMENTS 323142  7/1989  European Pat. Off. .
333406  9/1989  European Pat. Off. .
392408  10/1990 European Pat. Off. .
430640  6/1991  European Pat. Off. .
511813  11/1992 European Pat. Off. .

Primary Examiner—P. Hampton-Hightower
Attorney, Agent, or Firm—Burns, Doane, Swecker & Mathis.

[57] ABSTRACT

The present invention relates to a polyimide based resin composition comprises 1 to 50 parts by weight of polyetherimide for 100 parts by weight a resin composition comprising 50 to 99 parts by weight of polyarylether ketone and 50 to 1 parts by weight of polyimide having specific structural units.

The polyimide based resin compositions have excellent fatigue characteristics and creep resistance and are expected widely to apply in field of machine and automobile parts which is required permanence for mechanical strength.

11 Claims, No Drawings

POLYIMIDE BASED RESIN COMPOSITION

BACKGROUND OF THE INVENTION

1. Field of the Invention

The present invention relates to a heat resistant polyimide based resin composition having excellent resistance to fatigue and creep, and more particularly relates to a polyimide based resin composition comprising polyaryl ether ketone and polyetherimide in addition to extremely heat resistant polyimide and having improved fatigue resistance.

2. Description of the Related Art

Many kinds of polyimides which have been conventionally developed exhibit excellent properties such as heat resistance, static mechanical properties and chemical resistance. However, conventional polyimides have been insufficient in permanence properties such as fatigue resistance and creep properties. For example, a polyetherimide having recurring structural units of the formula (A):

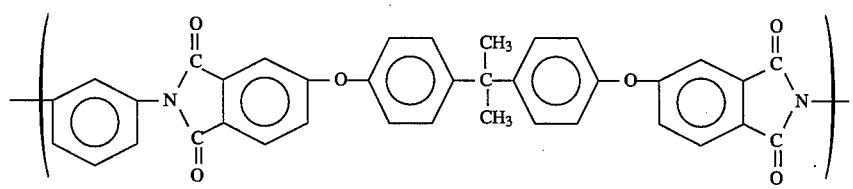

(A)

has a relatively high glass transition temperature of 210°~220° C. and good static mechanical strength and has been developed its uses in various fields.

The polyimide, however, is deficient in durability such as resistance to fatigue and creep, and thus it has been difficult to develop uses for parts which require durability, that is, components which are exposed to repeated high stress.

In order to solve these problems, polyimide having recurring structural units represented by the formula (B):

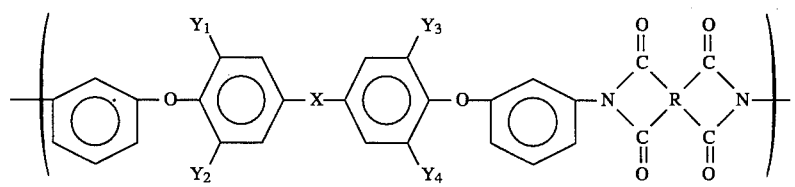

(B)

has already been developed (Japanese Laid Open Patent SHO 62-236858 and 62-253655).

The polyimide has a glass transition temperature which is 30°~40° C. higher than that of the polyetherimide of the formula (A) and is excellent in mechanical properties. In point of permanence properties such as fatigue resistance and creep properties, the polyimide is considerably improved as compared with the polyetherimide having recurring structural units of the formula (A). However, the improvement has been still unsatisfactory.

For the demand of a polyimide having excellent durability, polyimides having various outstanding properties, for example, a trial of alloying the polyimide having recurring structural units of the above formula (B) with polyarylether ketone having good durability has been proposed. However, a sufficiently improved polymer alloy has not yet been provided.

SUMMARY OF THE INVENTION

An object of the present invention is to provide a polyimide based resin composition having good resistance to fatigue and creep.

As a result of an intensive investigation in order to accomplish the object, the present inventors have found that a polyimide based resin composition having good resistance to fatigue and creep can be obtained by mixing polyimide having recurring structural units of the below described formula (1) and polyarylether ketone with polyetherimide in a specific range of composition, and alloying the resultant mixture. Thus, the present invention has been completed.

That is, one aspect of the present invention is a polyimide based resin composition having good resistance to fatigue and creep, comprising 1~50 parts by weight of polyetherimide for 100 parts by weight of a resin composition comprised of 50~1 parts by weight of polyarylether ketone and 50~99 parts by weight of a polyimide having recurring structural units represented by the formula (1):

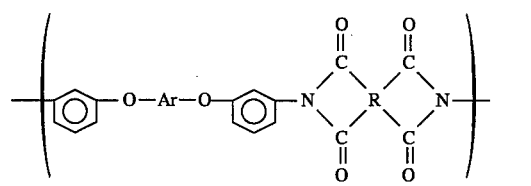

(1)

wherein Ar is

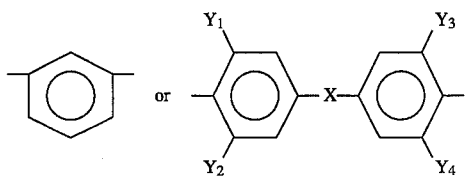 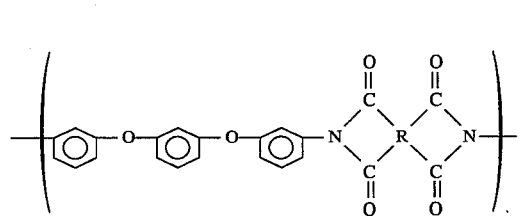

wherein X is one or more radicals selected from the group consisting of a direct bond, divalent hydrocarbon radical having 1~10 carbon atoms, hexafluorinated isopropylidene, carbonyl, thio, sulfonyl and ether radical, and $Y_1$, $Y_2$, $Y_3$ and $Y_4$ are individually one or more radicals selected from the group consisting of a hydrogen atom, lower alkyl radical, lower alkoxy radical, chlorine atom and bromine atom; and R is a tetravalent radical selected from the group consisting of an aliphatic radical having 4~9 carbon atoms, monocyclic aliphatic radical having 4~10 carbon atoms, monoaromatic radical, condensed polyaromatic radical, and noncondensed aromatic radical connected to each other with a direct bond or a bridge member.

Other aspects of the present invention are preferably, (1) a polyimide based resin composition comprising 1~50 parts by weight of polyetherimide for 100 parts by weight of a resin composition comprised of 50~5 parts by weight of polyarylether ketone and 50~95 parts by weight of a polyimide having recurring structural units represented by the formula (2):

wherein R is a tetravalent radical selected from the group consisting of an aliphatic radical having 4~9 carbon atoms, monocyclic aliphatic radical having 4~10 carbon atoms, monoaromatic radical, condensed polyaromatic radical, and noncondensed aromatic radical connected to each other with a direct bond or a bridge member, (3) a polyimide based resin composition wherein the polyimide comprises an end-capped polyimide polymer obtained by reacting diamine compound and tetracarboxylic dianhydride in the presence of aromatic dicarboxylic anhydride of the formula (4):

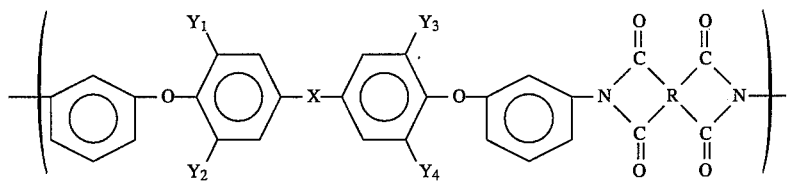

wherein X is one or more radicals selected from the group consisting of a direct bond, divalent hydrocarbon radical having 1~10 carbon atoms, hexafluorinated isopropylidene, carbonyl, thio, sulfonyl and ether radical, and $Y_1$, $Y_2$, $Y_3$ and $Y_4$ are individually one or more radicals selected from the group consisting of a hydrogen atom, lower alkyl radical, lower alkoxy radical, chlorine atom and bromine atom; and R is a tetravalent radical selected from the group consisting of an aliphatic radical having 4~9 carbon atoms, monocyclic aliphatic radical having 4~10 carbon atoms, monoaromatic radical, condensed polyaromatic radical, and noncondensed aromatic radical connected to each other with a direct bond or a bridge member, (2) a polyimide based resin composition comprising 1~50 parts by weight of polyetherimide for 100 parts by weight of a resin composition comprised of 50~1 parts by weight of polyarylether ketone and 50~99 parts by weight of a polyimide having recurring structural units represented by the formula (3):

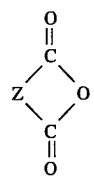

wherein Z is a divalent radical having 6~15 carbon atoms and being selected from the group consisting of a monoaromatic radical, condensed polyaromatic radical and noncondensed aromatic radical connected to each other with a direct bond or a bridge member, and/or aromatic monoamine represented by the formula (5):

$$V-NH_2 \qquad (5)$$

wherein V is a monovalent radical having 6~15 carbon atoms and being selected from the group consisting of a monoaromatic radical, condensed polyaromatic radical and noncondensed aromatic radical connected to each other with a direct bond or a bridge member, (4) a polyimide based resin composition wherein the polyarylether ketone comprises at least one selected from the group consisting of structural units represented by the formulae of from (6) to (10):

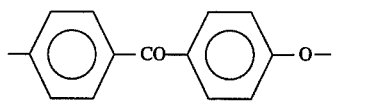
(6)

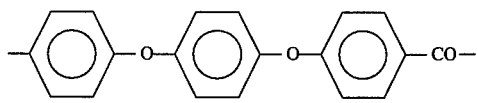
(7)

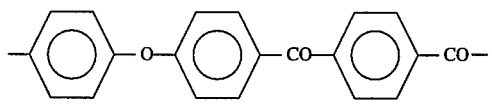
(8)

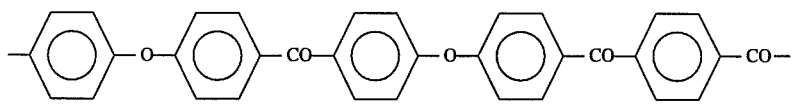
(9)

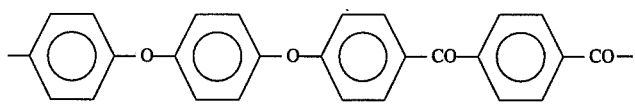
(10)

(5) a polyimide based resin composition wherein the polyetherimide has recurring structural units represented by the formula (11):

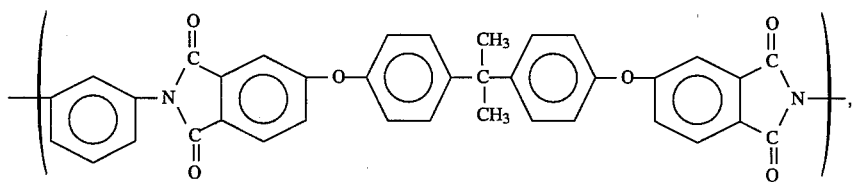
(11)

(6) a polyimide based resin composition improved a durability by heating at temperature of from 150° C. to 370° C.,
(7) a polyimide based resin composition which comprises 5 to 65 parts by weight of fibrous reinforcements for 100 parts by weight of the above polyimide based resin compositions, and
(8) an injection molded article obtained from the above polyimide based resin compositions.

The polyimide based resin composition of the present invention has excellent fatigue resistance, creep properties, and mechanical strength at a high temperature, and can be widely applied in the fields for parts which these characteristics is desired, for example, machine parts such as gears, shaft bushes, cams, bushings pulleys and sleeves; automobile parts such as impellers, manifolds, valve lifters, piston skirts, oil pans; and front covers, and chains.

DETAILED DESCRIPTION OF THE INVENTION

Polyimide used in the polyimide based resin composition of the present invention comprises one or more recurring structural units represented by the formula (1):

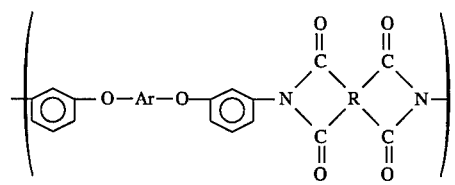
(1)

wherein Ar and R are the same as above.

Exemplified polyimides include polyimide having recurring structural units represented by the formula (3):

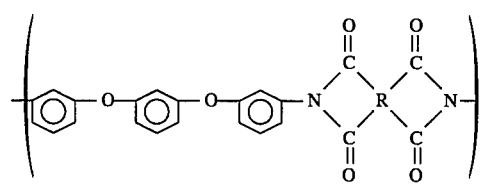
(3)

wherein R is the same as above, which Ar in the formula (1) is

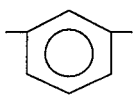

or polyimide having recurring structural units represented by the formula (2):

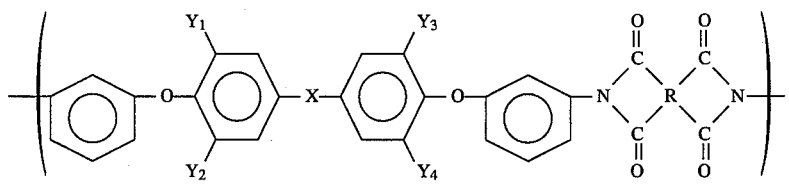

wherein X, $Y_1$~$Y_4$ and R are the same as above, which Ar in the formula (1) is

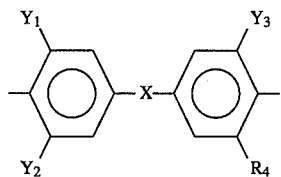

wherein X and $Y_1$~$Y_4$ are the same as above.

The polyimide used in the present invention can be prepared by the following processes.

Aromatic diamine compounds used as raw materials for the polyimide having recurring structural units represented by the formula (1) as fundamental skeleton are aromatic diamino compounds represented by the formula (1-1)

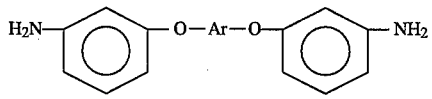

that is, the aromatic diamine compounds are 1,3-bis(3-aminophenoxy)benzene represented by the formula (3-1):

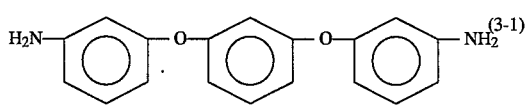

as a raw material for the polyimide having recurring structural units represented by the formula (3), and aromatic diamine compounds represented by the formula ( 2-1 ):

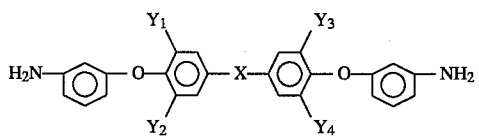

wherein X is one or more radicals selected from the group consisting of a direct bond, divalent hydrocarbon radical having 1–10 carbon atoms, hexafluorinated isopropylidene, carbonyl, thio, sulfonyl and ether radical, and $Y_1$, $Y_2$, $Y_3$ and $Y_4$ are individually one or more radicals selected from the group consisting of a hydrogen atom, lower alkyl radical, lower alkoxy radical, chlorine atom and bromine atom, as raw material for the polyimide having the recurring structural units represented by the formula (2).

The polyimide used in the present invention can be prepared by reacting one or more aromatic diamines with one or more tetracarboxylic dianhydrides represented by the formula (12):

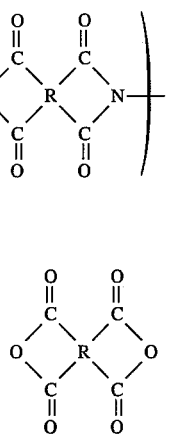

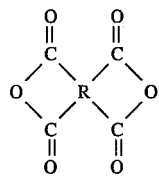

wherein R is a tetravalent radical selected from the group consisting of an aliphatic radical having 4–9 carbon atoms, monocyclic aliphatic radical having 4–10 carbon atoms, monoaromatic radical, condensed polyaromatic radical, and noncondensed aromatic radical connected to each other with a direct bond or a bridge member, in a solvent and then thermally or chemically imidizing the resultant polyamic acid.

Exemplary diamine compounds represented by the above formula (2-1) include;

the diamine compound which X in the formula (2-1) is direct bond, for example;
4,4'-bis(3-aminophenoxy)biphenyl,
4,4'-bis(3-aminophenoxy)-3-methylbiphenyl,
4,4'-bis(3-aminophenoxy)-3,3'-dimethylbiphenyl,
4,4'-bis(3-aminophenoxy)-3,5-dimethylbiphenyl,
4,4'-bis(3-aminophenoxy)-3,3',5,5'-tetramethylbiphenyl,
4,4'-bis(3-aminophenoxy)-3,3'-dichlorobiphenyl,
4,4'-bis(3-aminophenoxy)-3,5-dichlorobiphenyl,
4,4'-bis(3-aminophenoxy)-3,3',5,5'-tetrachlorobiphenyl,
4,4'-bis(3-aminophenoxy)-3,3'-dibromobiphenyl,
4,4'-bis(3-aminophenoxy)-3,5-dibromobiphenyl,
4,4'-bis(3-aminophenoxy)-3,3',5,5'-tetrabromobiphenyl, ② the diamine compound which X in the formula (2-1) is divalent hydrocarbon radical, for example;
bis[4-(3-aminophenoxy)phenyl]methane,
1,1-bis[4-(3-aminophenoxy)phenyl]ethane,
1,2-bis[4-(3-aminophenoxy)phenyl]ethane,
2,2-bis[4-(3-aminophenoxy)phenyl]propane,
2-[4-(3-aminophenoxy)phenyl]-2-(4-(3-aminophenoxy)-3-methylphenyl]propane,
2,2-bis[4-(3-aminophenoxy)-3-methylphenyl]propane,
2-[4-(3-aminophenoxy)phenyl]-2-[4-(3-aminophenoxy)-3,5-dimethylphenyl]propane,
2,2-bis[4-(3-aminophenoxy)-3,5-dimethylphenyl]propane,
2,2-bis[4-(3-aminophenoxy)phenyl]butane, ③ the diamine compound which X in the formula (2-1) is hexafluorinated isopropylidene radical, for example;

2,2-bis[4-(3-aminophenoxy)phenyl]-1,1,1,3,3,3-hexafluoropropane,

④ the diamine compound which X in the formula (2-1) is carbonyl radical, for example;
bis[4-(3-aminophenoxy)phenyl]ketone,
bis[4-{4-4-aminophenoxy)phenoxy}phenyl]ketone, ⑤ the diamine compound which X in the formula (2-1) is thio radical, for example;
bis[4-(3-aminophenoxy)phenyl]sulfide,
bis[4-(3-aminophenoxy)-3-methoxyphenyl]sulfide,
[4-(3-aminophenoxy)phenyl]4-(3-aminophenoxy)-3,5-dimethoxyphenyl]sulfide,
bis[4-(3-aminophenoxy)-3,5-dimethoxyphenyl]sulfide, ⑥ the diamine compound which X in the formula (2-1) is sulfonyl radical, for example;
bis[4-(3-aminophenoxy)phenyl]sulfone,
bis[4-{4-(4-aminophenoxy)phenoxy}phenyl]sulfone, ⑦ the diamine compound which X in the formula (2-1) is ether radical, for example;
bis[4-(3-aminophenoxy)phenyl]ether,
bis[4-(4-aminophenoxy)phenyl]ether.

These diamine compounds may be used either singly or in combination of two or more.

The polyimide used in the present invention is prepared by using the above aromatic diamine compound as raw materials. The polyimide prepared by simultaneous use of other diamines can also be used for the composition of the invention as long as no adverse effect is found on the good melt-flowability of the polyimide.

Other diamines which may be used as a mixture include, for example, m-aminobenzylamine, p-aminobenzylamine, bis(3-aminophenyl)ether, (3-aminophenyl)(4-aminophenyl)ether, bis(4-aminophenyl)ether, bis(3-aminophenyl)sulfide, (3-aminophenyl)(4-aminophenyl)sulfide, bis(4-aminophenyl)sulfide, bis(3-aminophenyl)sulfone, (3-aminophenyl)(4-aminophenyl)sulfone, bis(4-aminophenyl)sulfone, 3,3'-diaminobenzophenone, 3,4'-diaminobenzophenone, 4,4'-diaminobenzophenone, 2,2-bis[4-(4-aminophenoxy)phenyl]propane, 1,3-bis(4-aminophenoxy)benzene, 1,4-bis(3-aminophenoxy)benzene, 1,4-bis(4-aminophenoxy)benzene, 4,4'-bis(4-aminophenoxy)biphenyl, bis[4-(4-aminophenoxy)phenyl]ketone, bis[4-(4-aminophenoxy)phenyl]sulfide, bis[4-(4-aminophenoxy)phenyl]sulfoxide, and bis[4-(4-aminophenoxy)phenyl]sulfone.

These aromatic diamine compounds are usually used with amount of less than 30% by weight per the essential aromatic diamine compound, preferably less than 5% by weight.

Tetracarboxylic dianhydride which is another raw material for preparing the polyimide used in the present invention is represented by the above formula (12).

In the tetracarboxylic dianhydride represented by the formula (12), R is one or more tetravalent radicals selected from the group consisting of from (a) to (e):

(a) an aliphatic radical having 4~9 carbon atoms, (b) an alicyclic radical having 4~10 carbon atoms, (c) a monoaromatic radical represented by the formula:

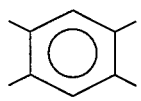

(d) a condensed polyaromatic radical represented by the formula:

or

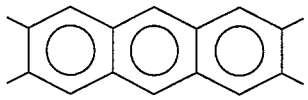

(e) a noncondensed aromatic radical connected to each other with a direct bond or a bridge member and represented by the formula:

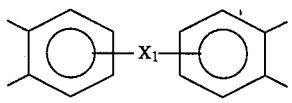

wherein $X_1$ is a direct bond, —O—, —S—, —SO$_2$—, —CH$_2$—, —CO—

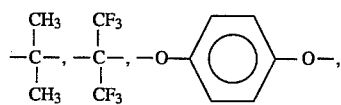

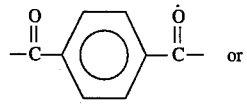

or

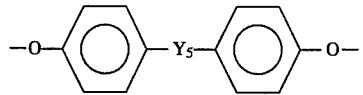

wherein $Y_5$ is direct bond, —O—, —S—, —SO$_2$—, —CH$_2$—, —CO—,

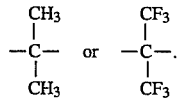

Tetracarboxylic dianhydrides for preparing the polyimide used in the present invention include, for example, ① the tetracarboxylic dianhydride which R in the formula (12) is an aliphatic radical;
ethylenetetracarboxylic dianhydride,
butanetetracarboxylic dianhydride, ② the tetracarboxylic dianhydride which R in the formula (12) is an alicyclic radical;
cyclopentanetetracarboxylic dianhydride, ③ the mono aromatic radical which R in the formula (12) is an alicyclic radical;
pyromellitic dianhydride,
1,2,3,4-benzenetetracarboxylic dianhydride, ④ the condensed polyaromatic radical which R in the formula (12) is an alicyclic radical;
2,3,6,7-naphthalenetetracarboxylic dianhydride,
1,4,5,8-naphthalenetetracarboxylic dianhydride,
1,2,5,6-naphthalenetetracarboxylic dianhydride,
3,4,9,10-perylenetetracarboxylic dianhydride,
2,3,6,7-anthracenetetracarboxylic dianhydride, and 1,2,7,8-phenanthrenetetracarboxylic dianhydride.

⑤ the tetracarboxylic dianhydride which R of the formula (12) is the following formula;

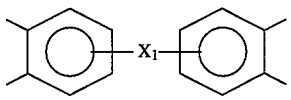

and (1) wherein X₁ in the above formula is direct bond; for example,
3,3',4,4'-biphenyltetracarboxylic dianhydride,
2,2',3,3'-biphenyltetracarboxylic dianhydride;

(2) wherein X₁ in the above formula is ether radical, for example, bis(3,4-dicarboxyphenyl)ether dianhydride;

(3) wherein X₁ in the above formula is thio radical, for example, bis(3,4-dicarboxyphenyl)thioether dianhydride;

(4) wherein X₁ in the above formula is an aliphatic radical such as —CH₂—, —C(CH₃)₂— and —C(CF₃)₂—, for example,
bis(2,3-dicarboxyphenyl)methane dianhydride,
bis(3,4-dicarboxyphenyl)methane dianhydride,
1,1-bis(2,3-dicarboxyphenyl)ethane dianhydride,
2,2-bis(3,4-dicarboxyphenyl)propane dianhydride,
2,2-bis(2,3-dicarboxyphenyl)propane dianhydride,
2,2-bis(3,4-dicarboxyphenyl)-1,1,1,3,3,3-hexafluoropropane dianhydride,
2,2-bis(2,3-dicarboxyphenyl)-1,1,1,3,3,3-hexafluoropropane dianhydride;

(5) wherein X₁ of the above formula is a sulfonyl radical, for example,
bis(3,4-dicarboxyphenyl)sulfone dianhydride;

(6) wherein X₁ of the above formula is a carbonyl radical, for example,
3,3',4,4'-benzophenonetetracarboxylic dianhydride,
2,2',3,3'-benzophenonetetracarboxylic dianhydride;

(7) wherein X₁ of the above formula is another radical, for example,
1,3-bis(3,4-dicarboxyphenoxy)benzene dianhydride,
1,4-bis(3,4-dicarboxyphenoxy)benzene dianhydride,
1,3-bis(3,4-dicarboxybenzoyl)benzene dianhydride,
1,4-bis(3,4-dicarboxybenzoyl)benzene dianhydride,
2,2-bis{4-[4-(1,2-dicarboxy)phenoxy]phenyl)propane dianhydride,
2,2-bis{4-[3-(1,2-dicarboxy)phenoxy]phenyl)propane dianhydride,
bis{4-[4-(1,2-dicarboxy)phenoxy]phenyl)ketone dianhydride,
bis{4-[3-(1,2-dicarboxy)phenoxy]phenyl)ketone dianhydride,
4,4'-bis[4-(1,2-dicarboxy)phenoxy]biphenyl dianhydride,
4,4'-bis[3-(1,2-dicarboxy)phenoxy]biphenyl dianhydride,
bis{4-[4-(1,2-dicarboxy)phenoxy]phenyl}sulfone dianhydride,
bis{4-[3-(1,2-dicarboxy)phenoxy]phenyl}sulfone dianhydride,
bis{4-[4-(1,2-dicarboxy)phenoxy]phenyl}sulfide dianhydride,
bis{4-[3-(1,2-dicarboxy)phenoxy]phenyl}sulfide dianhydride,
2,2-bis{4-[4-(1,2-dicarboxy)phenoxy]phenyl}-1,1,1,2,2,2-hexafluoropropane dianhydride, and
2,2-bis {4-[3-(1,2-dicarboxy)phenoxy]phenyl}-1,1,1,2,2,2-hexafluoropropane dianhydride.

These tetracarboxylic dianhydrides may be used either singly or in combination of two or more.

The capped polyimide having at the polymer chain end an aromatic ring which is unsubstituted or substituted with a radical having no reactivity with amine or dicarboxylic anhydride, or the polyimide containing the end-capped polyimide, also may be used in the polyimide based resin composition of the present invention.

The end-capped polyimide can be prepared by reacting the above diamine compound with the above tetracarboxylic dianhydride in the presence of aromatic dicarboxylic anhydride of the formula (4):

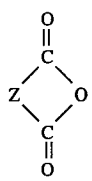

(4)

wherein Z is a divalent radical having 6~15 carbon atoms and being selected from the group consisting of a monoaromatic radical, condensed polyaromatic radical and noncondensed aromatic radical connected to each other with a direct bond or a bridge member, and/or aromatic monoamine represented by the formula (5):

$$V-NH_2 \qquad (5)$$

wherein V is a monovalent radical having 6~15 carbon atoms and being selected from the group consisting of a monoaromatic radical, condensed polyaromatic radical and noncondensed aromatic radical connected to each other with a direct bond or a bridge member.

Exemplary aromatic dicarboxylic anhydrides of the formula (4) include phthalic anhydride, 2,3-benzophenonedicarboxylic anhydride, 3,4-benzophenonedicarboxylic anhydride, 2,3-dicarboxyphenyl phenyl ether anhydride, 3,4-dicarboxyphenyl phenyl ether anhydride, 2,3-biphenyldicarboxylic anhydride, 3,4-biphenyldicarboxylic anhydride, 2,3-dicarboxyphenyl phenyl sulfone anhydride, 3,4-dicarboxyphenyl phenyl sulfone anhydride, 2,3-dicarboxyphenyl phenyl sulfide anhydride, 3,4-dicarboxyphenyl phenyl sulfide anhydride, 1,2-naphthalenedicarboxylic anhydride, 2,3-naphthalenedicarboxylic anhydride, 1,8-naphthalenedicarboxylic anhydride, 1,2-anthracenedicarboxylic anhydride, 2,3-anthracenedicarboxylic anhydride and 1,9-anthracenedicarboxylic anhydride. These aromatic dicarboxylic anhydrides can be substituted with a radical having no reactivity with amine and dicarboxylic anhydride and may be used singly or as a mixture.

Phthalic anhydride is most preferred in view of properties and utility of polyimide obtained.

The amount of aromatic dicarboxylic anhydride used is 0.001~1.0 mol per mol of the above aromatic diamine represented by the formula (2-1) or (3-1). An amount less than 0.001 mol leads to viscosity increase in processing at high temperatures and causes deterioration of processability. On the other hand, an amount exceeding 1.0 mol results in lowered mechanical properties. Preferred amount is in the range of 0.01 to 0.5 mol.

Aromatic monoamines of the formula (5) include, for example, aniline, o-toluidine, m-toluidine, p-toluidine, 2,3-xylidine, 2,6-xylidine, 3,4-xylidine, 3,5-xylidine, o-chloroaniline, m-chloroaniline, p-chloroaniline, o-bromoaniline, m-bromoaniline, p-bromoaniline, o-nitroaniline, m-nitroaniline, p-nitroaniline, o-aminophenol, m-aminophenol, p-aminophenol, o-anisidine, m-anisidine, p-anisidine, o-phenetidine, m-phenetidine, p-phenetidine, o-aminobenzaldehyde, m-aminobenzaldehyde, p-aminobenzaldehyde, o-aminobenzonitrile, m-aminobenzonitrile, p-aminobenzonitrile, 2-aminobiphenyl, 3-aminobiphenyl, 4-aminobiphenyl, 2-aminophenyl phenyl ether, 3-aminophenyl phenyl ether, 4-aminophenyl phenyl ether, 2-aminobenzophenone, 3-aminobenzophenone, 4-aminobenzophenone, 2-aminophenyl phenyl sulfide, 3-aminophenyl phenyl sulfide, 4-aminophenyl phenyl sulfide, 2-aminophenyl phenyl sulfone, 3-aminophenyl phenyl sulfone, 4-aminophenyl phenyl sulfone, α-naphthylamine, β-naphthylamine, 1-amino-2-naphthol, 2-amino-1-naphthol, 4-amino-1-naphthol, 5-amino-2-naphthol, 7-amino-2-naphthol, 8-amino-1-naphthol, 8-amino-2-naphthol, 1-aminoanthracene, 2-aminoanthracene, and 9-aminoanthracene. These aromatic monoamines can be substituted with a radical having no reactivity with amine or dicarboxylic anhydride, and can be used singly or as a mixture. Aniline is most preferably used in view of properties and utility of polyimide obtained.

The amount of aromatic monoamine is 0.001~1.0 mol per mol of the aromatic tetracarboxylic dianhydride represented by the above formula (12).

An amount less than 0.001 mol leads to a viscosity increase in processing at high temperatures and causes deterioration of processability. On the other hand, an amount exceeding 1.0 mol results in lowered mechanical properties. Preferred amount is in the range of 0.01~0.5 mol.

Polyimide used in the present invention can be prepared by any known process. For example, preparation is carried out by the following processes.

(1) A process for preparing polyamic acid in an organic solvent isolating the polyamic acid by removing the solvent at a low temperature under reduced pressure or by pouring the resulting polyamic acid solution into a lean solvent, and imidizing the polyamic acid by heating to obtain polyimide.

(2) A process for preparing a polyamic acid solution by the same procedures as (1), chemically imidizing polyamic acid by addition of a dehydrating agent such as acetic anhydride optionally in the presence of a catalyst, successively isolating resultant polyimide by known procedures and, if desired, washing and drying the polyimide.

(3) A process for preparing polyamic acid solvent by the same procedures as (1) and successively conducting solution removal and thermal imidization at the same time by heating under reduced pressure.

(4) A process for mixing raw materials and solvents, and simultaneously conducting preparation of aromatic polyamic acid and imidization reaction thereof by heating optionally in the presence of a catalyst, azeotropic agent or dehydrating agent.

In the preparation of polyimide by these processes, it is particularly preferred to carry out the reaction in organic solvents.

Organic solvents which can be used include, for example, N,N-dimethylformamide, N,N-dimethylacetamide, N,N-diethylacetamide, N,N-dimethylmethoxyacetamide, N-methyl-2-pyrrolidone, 1,3-dimethyl-2-imidazolidinone, N-methylcaprolactam, 1,2-dimethoxyethane, bis(2-methoxyethyl)ether, 1,2-bis(2-methoxyethoxy)ethane, bis[2-(2-methoxyethoxy)ethyl]ether, tetrahydrofuran, 1,3-dioxane, 1,4-dioxane, pyridine, picoline, dimethyl sulfoxide, dimethyl sulfone, tetramethylurea, hexamethylphosphoramide, phenol, o-cresol, m-cresol, p-cresol, m-cresylic acid, p-chlorophenol, xylenols and anisole. These solvents can be used singly or as a mixture.

When polyimide is prepared in a solvent by using aromatic diamines, tetracarboxylic dianhydrides and dicarboxylic anhydrides or aromatic monoamines, these raw materials are charged and reacted by the following methods.

(1) A method for reacting tetracarboxylic dianhydride with aromatic diamine and successively adding dicarboxylic anhydride or aromatic monoamine to continue the reaction.

(2) A method for reacting aromatic diamine with dicarboxylic anhydride and successively adding tetracarboxylic dianhydride to continue the reaction. Alternatively, a method for reacting tetracarboxylic dianhydride with aromatic monoamine and successively adding aromatic diamine to continue the reaction.

(3) A method for simultaneously charging tetracarboxylic dianhydride aromatic diamine and dicarboxylic anhydride or aromatic monoamine to carry out the reaction.

Any of the above methods can be employed for progressing the reaction.

In these methods, the reaction temperature for polymerization and imidization is 300° C. or less. No particular limitation is imposed upon the reaction pressure, and the reaction can be sufficiently carried out under atmospheric pressure.

The reaction time differs depending upon diamine, tetracarboxylic dianhydride, solvent, catalyst and reaction temperature. The reaction time of 4~24 hours is usually sufficient.

Polyimide having recurring structural units represented by the formula (1) used in the present invention usually has an inherent viscosity of 0.35~1.0 dl/g, preferably 0.40~0.95 dl/g, more preferably 0.4~0.9 dl/g. When the inherent viscosity is less than 0.35 dl/g, mechanical strengths and durability of polyimide itself are insufficient. On the other hand, an inherent viscosity exceeding 1.0 dl/g, injection molding is very difficult because of poor processability. Inherent viscosity was measured at 35° C. after heat-dissolving polyimide in a solvent mixture composed of 9 parts by weight of p-chlorophenol and 1 part by weight of phenol at a concentration of 0.5 g/100 ml.

Polyarylether ketone used in the polyimide based resin composition of the present invention includes a polyarylether ketone which comprises at least one selected from the group consisting of structural units represented by the formulae of from (6) to (10):

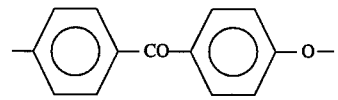

(6)

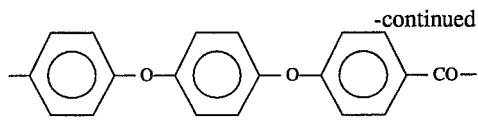 (7)

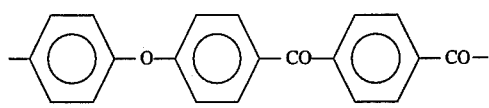 (8)

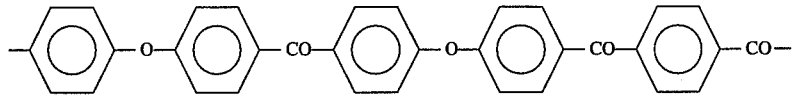 (9)

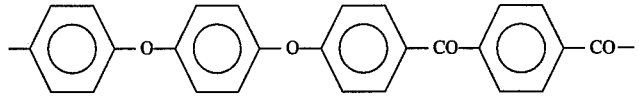 (10)

That is, the polyarylether ketone may be a homopolymer having one of structural unit selected from formulae (6)~(10), or may be a copolymer having two or more of structural units selected from formulae (6)~(10), or may be mixture comprising these homopolymers and/or copolymers.

The composition for polyarylether ketone and polyimide in the polyimide based resin composition comprises 50 to 1 parts by weight of polyarylether ketone and 50 to 99 parts by weight of polyimide having recurring structural units represented by the formula (1).

In the case of the composition comprising the polyimide having recurri-structural units of the formula (2), especially, the composition comprises 50 to 5 parts by weight of polyarylether ketone and 50 to 95 parts by weight of the polyimide.

When the amount of the polyarylether ketone exceeds 50 parts by weight, it is undesirable because of it's poor heat resistance, on the other hand, when the amount is less than 5 parts by weight, the effect for improving permanence properties is insufficient.

In the case of the composition comprising the polyimide having recurring structural units represented by the formula (3), the composition preferably comprises 50 to 1 parts by weight of polyarylether ketone and 50 to 99 parts by weight of the polyimide.

In this composition, an amount exceeding 50 parts by weight of the polyarylether ketone also tends to lower heat resistance of the polyimide, and an amount less than 1 parts by weight is insufficient to improve permanence properties.

Polyetherimide used in the polyimide based resin composition of the present invention has a recurring structural units represented by the following formula:

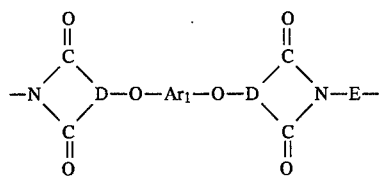

wherein D is a trifunctional aromatic group where two functional groups out of three are connected with adjacent carbon atoms, both E and $Ar_1$ are residue of divalent aromatic group.

The polyetherimide is a polymer consisting of ether and imide linkages as a required bonding unit and is substantially composed of recurring units which are represented by the above formula. Exemplary structural units of the polyetherimide are as follows;

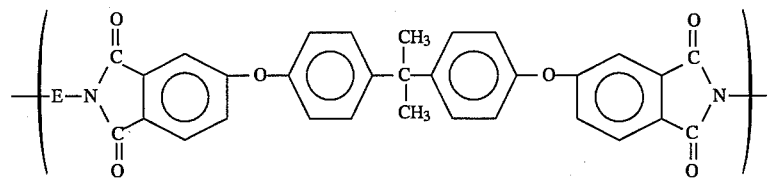

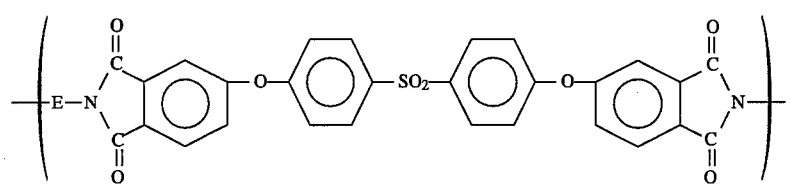

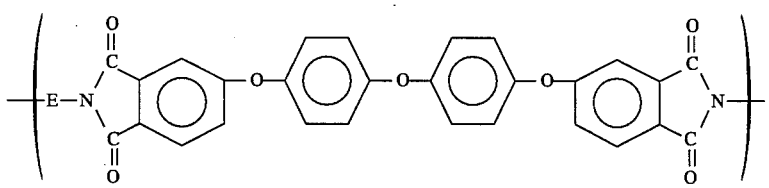

and E in these formula is residue of divalent aromatic group such as,

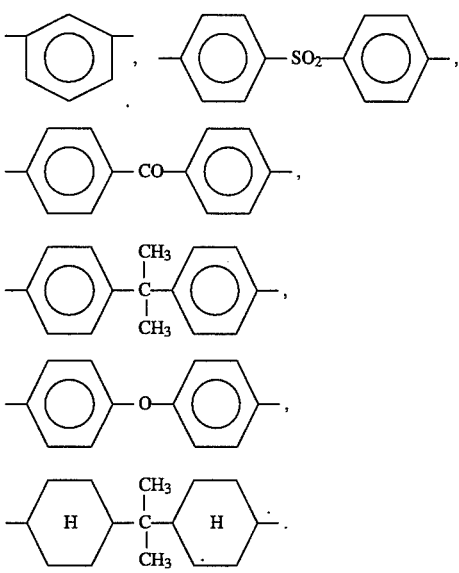

Especially, the polyetherimide represented by the formula (11)

(11)

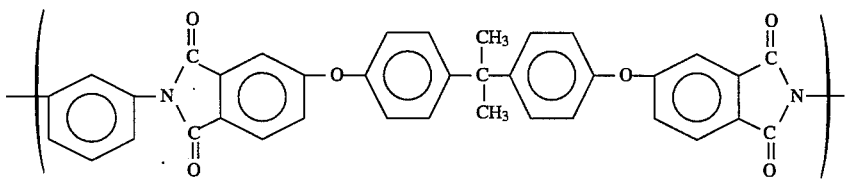

is preferably used in the present invention.

The polyetherimide is commercially available from General Electric Co. with the Trade Mark of ULTEM-1000.

An amount of polyetherimide in the polyimide based resin composition is 1 to 50 parts by weight for 100 parts by weight of a resin composition comprising 50 to 99 parts by weight of polyimide used in the present invention, that is, the polyimide represented by the formula (1), (2) or (3), and 50 to 1 parts by weight of polyarylether ketone, preferably 5 to 25 parts by weight, more preferably 10 to 20 parts by weight.

When an amount of polyetherimide exceeds 50 parts by weight, permanence properties of the composition decreases. On the other hand, an amount less than 1 part by weight does not lead to an outstandingly improving effect for permanence properties of the composition.

A satisfactory effect for improving permanence properties could not been obtained even though polyarylether ketone was added to polyimide having recurring structural units of the formula (1) and alloying the mixture. However, surprisingly, further addition of polyetherimide to the above resin mixture can remarkably improve the permanence properties of the resin mixture.

It is thought on the effect that polyimide and polyarylether ketone alone cannot provide sufficient compatibility whereas added polyetherimide acts as a compatibility enhancing agent between polyimide and polyarylether ketone, makes these components mutually soluble and improves durability of the polyimide based resin composition.

The polyimide based resin composition has also achieved a marked improvement on high temperature durability in addition to the improvement of permanence properties at room temperature. Thus good durability can also be maintained at high temperature.

No particular restriction is imposed upon the preparation process of the polyimide based resin composition. Any process can be applied as long as the process can provide the composition by mixing the above requisite components.

Usually, the following processes are often used.

① A process for melt-extruding and pelletizing after mixing and pulverizing polyimide, polyarylether ketone and polyetherimide with a mortar, Henschel mixer, drum blender, tumbling blender, ball mill and ribbon blender.

② A process for dissolving or uniformly dispersing polyimide, polyarylether ketone and polyetherimide in an organic solvent and successively removing the solvent to obtain a powder or film.

③ A process for adding polyarylether ketone and polyetherimide to an organic solvent solution of polyamic acid precursor of the polyimide, uniformly dissolving or dispersing the mixture, thermally imidizing polyamic acid by heating to 100°–400° C. or chemically imidizing polyamic acid by using a common imidizing agent, and removing the solvent to obtain a powder or film.

In addition, the present resin composition can exhibit outstandingly improved mechanical strength, especially permanence properties, by heat treating the composition at the specified temperature.

The temperature for the heat-treatment is the range of from 150° to 370° C., preferably from 160° to 330° C., more preferably from 160° to 320° C.

Times for heat treatment varies depending upon treating temperature, usually, the time is at least 4 hours in the above temperature range.

Further, the polyimide based resin composition of the present invention includes another polyimide based resin composition reinforced by a fibrous reinforcement, which is comprised of the polyimide, the polyarylether ketone, the polyetherimide and a fibrous reinforcement.

Exemplary fibrous reinforcements which can be used in this composition include glass fibers, ceramic fibers, potassium titanate fibers, aromatic polyamide fibers, metal fibers, boron fibers, silicon carbide fibers, asbestos fibers, rock fibers and carbon fibers, preferably, glass fibers, aromatic polyamide fibers, potassium titanate fibers and carbon fibers.

The amount of the fibrous reinforcements used in the polyimide based resin composition is 5~65 parts by weight for 100 parts by weight of the above resin composition comprised of the polyimide, the polyarylether ketone and the polyetherimide, preferably 10–60 parts by weight. Thus, the polyimide based resin composition having excellent fatigue characteristics can be obtained by adding the fibrous reinforcements in the amount of the above range to the above resin composition.

In the polyimide based resin composition, further, one or more additives can be added, if desired.

Exemplary additives which can be used include, fillers such as calcium carbonate, mica, glass beads, graphite, molybdenum disulfide, clay, silica, alumina, talc, diatomaceous earth, hydration alumina and shirasu balloons; lubricants; release agents; stabilizers; colorants; crystalline nucleating agents; plasticizer; other noncrystalline resins such as polyether sulfone, polyether imide, polysulfone and polycarbonate; other crystalline resins such as polyphenylene sulfide, polyether nitrile, polyamide and polyamide-imide, and thermosetting resins such as epoxy resin, silicone resin and polyamide imide resin.

The polyimide based resin composition of the present invention can provide various forms of articles, which have good resistance to fatigue and creep, by changing the mold for injection molding.

The articles by injection molding can be applied of the field in parts such as machine parts and automobile parts, wherein the noted characteristics are required.

The present invention will hereinafter be illustrated in detail by way of examples and comparative examples.

The properties of the composition obtained in each example and comparative example were tested by the following, methods.

1) Fatigue test:

Tensile fatigue tests were carried out as follows by using ASTM No.1 Dumbbell specimens obtained in the examples and comparative examples.

(1) The number of repetitions until the specimen was broken was measured under the conditions; 5 Hz, stress amplitude 5.5 kg/mm$^2$, stress ratio=0, at room temperature.

(2) The number repetitions until the specimen was broken was measured under the conditions; 30 Hz, stress amplitude 12kg/mm$^2$, stress ratio=0, at room temperature.

2) High temperature fatigue test:

Tensile fatigue tests at a high temperature were carried out as follows by using ASTM No.1 Dumbbell specimens obtained in the examples and comparative examples.

(1) The number of repetitions until the specimen was broken was measured under the conditions: 5 Hz, stress amplitude 3.0 kg/mm$^2$, stress ratio=0, at 140° C.

(2) The number of repetitions until the specimen was broken was measured under the conditions; 30 Hz, stress amplitude 8 kg/mm$^2$, stress ratio=0, at 140° C.

(3) The number of repetitions until the specimen was broken was measured under the conditions; 30Hz, stress amplitude 10 kg/mm$^2$, stress ratio=0, at 140° C.

3) Tensile Strength:

Measured in accordance with ASTM D-638.

4) Creep strength at break(kg/mm$^2$):

In the creep test, the stress which caused the first break at 1500 hours was measured.

5) Creep strength at break(%):

The ratio of tensile strength in the above 3) to the above creep strength at break was calculated.

6) Heat distortion temperature (HDT):

Measured in accordance with ASTM D-648.

7) Tensile strength at 150° C. (kg/mm$^2$):

Measured in accordance with ASTM D-638.

The polyarylether ketones used in the examples and comparative examples have individually the following structural units.

1) PEEK (PEEK 450 P; Trade Mark of Imperial Chemicals Industries Ltd.)

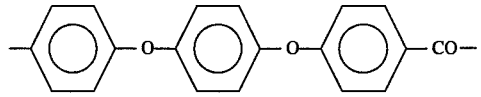

2) PEKEKK (ULTRA PEK A-1000; Trade Mark of B.A.S.F.)

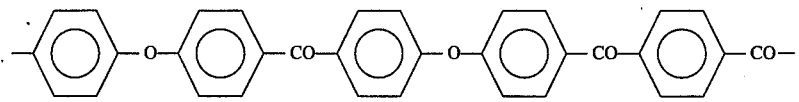

3) PEK (PEK 220; Trade Mark of Imperial Chemicals Industries Ltd.)

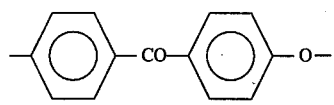

Example 1

For 90 parts by weight of polyimide which was prepared from 4,4'-bis(3-aminophenoxy)biphenyl and pyromellitic dianhydride and had an inherent viscosity of 0.50 dl/g and 10 parts by weight of polyarylether ketone (PEEK 450 P; Trade Mark of I.C.I. Ltd.), 5 parts by weight of polyetherimide (ULTEM 1000; Trade Mark of General Electric Co.) was dry blended with a mixer, successively extruded through a twin screw extruder at 370°–400° C. and cut into pellets. The pellets thus obtained were injection molded at cylinder temperature of 370°–410° C., injection pressure of 900 kg/cm$^2$ and mold temperature of 160° C. to form test specimens.

Various properties were measured by these specimens. Test items, test methods and results are illustrated in Table 1.

Examples 2~10

Test specimens were prepared by carrying out the same procedures as described in Example 1 except that compositions illustrated in examples 2~10 in Table 1 were used.

Various properties were measured by these specimens. Test items, test methods and results are illustrated in Table 1.

Examples 11 and 12

Test specimens were prepared by carrying out the same procedures as described in Example 1 except that compositions illustrated in examples 11 and 12 in Table 1 and PEKEKK (ULTRA PEK A 1000; Trade Mark of B.A.S.F.) as polyarylether ketone ketone, were used.

Various properties were measured by these specimens. Test items, test methods and results are illustrated in Table 1.

Example 13

Test specimens were prepared by carrying out the same procedures as described in Example 1 except that compositions illustrated in example 13 in Table 1 and PEK (PEK 220; Trade Mark of I.C.I. Ltd.) as polyarylether ketone, were used.

Various properties were measured by these specimens. Test items, test methods and results are illustrated in Table 1.

TABLE 1

|  | Example 1 | Example 2 | Example 3 | Example 4 | Example 5 | Example 6 | Example 7 |
|---|---|---|---|---|---|---|---|
| Composition (parts by weight) | | | | | | | |
| Polyimide | 90 | 80 | 70 | 60 | 60 | 60 | 60 |
| Polyaryletherketone | 10 | 20 | 30 | 40 | 40 | 40 | 40 |
| Polyetherimide | 5 | 15 | 15 | 2 | 5 | 15 | 25 |
| Carbon fiber | — | — | — | — | — | — | — |
| Fatigue test*[1] (5.5 kg/mm$^2$)*[2] | $1.1 \times 10^5$ | $1.1 \times 10^5$ | $1.3 \times 10^5$ | $0.7 \times 10^5$ | $1.2 \times 10^5$ | $1.5 \times 10^5$ | $1.3 \times 10^5$ |
| High temperature fatigue test*[1] (3.0 kg/mm$^2$)*[2] | $7.5 \times 10^4$ | $8.0 \times 10^4$ | $8.8 \times 10^4$ | $0.6 \times 10^4$ | $1.5 \times 10^4$ | $9.0 \times 10^4$ | $8.5 \times 10^4$ |
| Tensile strength (kg/mm$^2$) | 11.5 | 11.6 | 11.1 | 11.4 | 11.4 | 11.5 | 11.3 |
| Creep strength at break (kg/mm$^2$) | 8.5 | 8.9 | 9.1 | 8.6 | 8.9 | 9.2 | 9.9 |
| Creep strength at break (%) | 74 | 77 | 82 | 75 | 78 | 80 | 88 |
| HDT (°C.)*[3] | 220 | 216 | 213 | 216 | 214 | 210 | 210 |
| Kind of polyarylether ketone | PEEK 450 P | ← | ← | ← | ← | ← | ← |

|  | Example 8 | Example 9 | Example 10 | Example 11 | Example 12 | Example 13 |
|---|---|---|---|---|---|---|
| Composition (parts by weight) | | | | | | |
| Polyimide | 60 | 80 | 60 | 80 | 60 | 70 |
| Polyaryletherketone | 40 | 20 | 40 | 20 | 40 | 30 |
| Polyetherimide | 43 | 25 | 25 | 15 | 15 | 10 |
| Carbon fiber | — | — | — | — | — | — |
| Fatigue test*[1] (5.5 kg/mm$^2$)*[2] | $0.7 \times 10^5$ | $1.0 \times 10^5$ | $1.3 \times 10^5$ | $5.0 \times 10^5$ | $6.2 \times 10^5$ | $8.0 \times 10^5$ |
| High temperature fatigue test*[1] (3.0 kg/mm$^2$)*[2] | $7.2 \times 10^4$ | $7.6 \times 10^4$ | $8.3 \times 10^4$ | $11.0 \times 10^4$ | $23.5 \times 10^4$ | $40.3 \times 10^4$ |
| Tensile strength (kg/mm$^2$) | 10.6 | 11.8 | 10.7 | 9.8 | 9.8 | 10.2 |
| Creep strength at break (kg/mm$^2$) | 8.5 | 8.9 | 9.2 | 9.0 | 9.0 | 9.0 |
| Creep strength at break (%) | 80 | 75 | 86 | 92 | 92 | 88 |
| HDT (°C.)*[3] | 208 | 212 | 208 | 226 | 220 | 219 |

TABLE 1-continued

| Kind of polyaryl-ether ketone | ← | PEEK 450 P | ← | PEKEKK A-1000 | ← | PEK220 |
| --- | --- | --- | --- | --- | --- | --- | note)
*¹Number of repetition until the specimen was broken.
*²Stress
*3HDT—Heat distortion temperature

Comparative Example 1

Test specimens were prepared by carrying out the same procedures as described in Example 1 except that compositions illustrated in comparative example 1 in Table 2 were used.

Various properties were measured by these specimens. Test items, test methods and results are illustrated in Table 2.

Comparative Example 2

Test specimens were prepared by carrying out the same procedures as described in Example 1 except that compositions illustrated in comparative example 2 in Table 2 and PEEK (PEEK 450 P; Trade Mark of I.C.I.Ltd.) as polyarylether ketone, were used.

Various properties were measured by these specimens. Test items, test methods and results are illustrated in Table 2.

Comparative Example 3

Test specimens were prepared by carrying out the same procedures as described in Example 1 except that compositions illustrated in comparative example 3 in Table 2 and PEKEKK (ULTRA PEK A 1000; Trade Mark of B.A.S.F.) as polyarylether ketone, were used.

Various properties were measured by these specimens. Test items, test methods and results are illustrated in Table 2.

Comparative Example 4

Test specimens were prepared by carrying out the same procedures as described in Example 1 except that compositions illustrated in comparative example 4 in Table 2 and PEK (PEK 220; Trade Mark of I.C.I. Ltd.) as polyarylether ketone, were used.

Various properties were measured by these specimens. Test items, test methods and results are illustrated in Table 2.

Comparative Example 5

Test specimens were prepared by carrying out the same procedures as described in Example 1 except that compositions illustrated in comparative example 5 in Table 2 and PEEK (PEEK 450 P; Trade Mark of I.C.I. Ltd.) as polyarylether ketone, were used.

Various properties were measured by these specimens. Test items, test methods and results are illustrated in Table 2.

Comparative Example 6

Test specimens were prepared by carrying out the same procedures as described in Example 1 except that compositions illustrated in comparative example 6 in Table 2 and PEKEKK (ULTRA PEK A 1000; Trade Mark of B.A.S.F.) as polyarylether ketone, were used.

Various properties were measured by these specimens. Test items, test methods and results are illustrated in Table 2.

Comparative Example 7

Test specimens were prepared by carrying out the same procedures as described in Example 1 except that compositions illustrated in comparative example 7 in Table 2 and PEEK (PEEK 450 P; Trade Mark of I.C.I. Ltd.) as polyarylether ketone, were used.

Various properties were measured by these specimens. Test items, test methods and results are illustrated in Table 2.

Comparative Example 8

Test specimens were prepared by carrying out the same procedures as described in Example 1 except that PEEK (PEEK 450 P; Trade Mark of I.C.I. Ltd.) as polyarylether ketone, were used.

Various properties were measured by these specimens. Test items, test methods and results are illustrated in Table 2.

TABLE 2

|  | Compara. example 1 | Compara. example 2 | Compara. example 3 | Compara. example 4 | Compara. example 5 | Compara. example 6 | Compara. example 7 | Compara. example 8 |
| --- | --- | --- | --- | --- | --- | --- | --- | --- |
| Composition (parts by weight) | | | | | | | | |
| Polyimide | 100 | 60 | 60 | 70 | 60 | 60 | 30 | — |
| Polyarylether- | — | 40 | 40 | 30 | 40 | 40 | 70 | 100 |

TABLE 2-continued

|  | Compara. example 1 | Compara. example 2 | Compara. example 3 | Compara. example 4 | Compara. example 5 | Compara. example 6 | Compara. example 7 | Compara. example 8 |
|---|---|---|---|---|---|---|---|---|
| ketone |  |  |  |  |  |  |  |  |
| Polyetherimide |  |  |  |  | 70 | 80 | 15 |  |
| Carbon fiber | — | — | — | — | — | — | — | — |
| Fatigue test*1 (5.5 kg/mm²)*2 | $0.2 \times 10^5$ | $0.5 \times 10^5$ | $0.8 \times 10^5$ | $0.9 \times 10^5$ | $0.2 \times 10^5$ | $0.4 \times 10^5$ | $9.0 \times 10^5$ | $1.0 \times 10^7$ unbroken |
| High temperature fatigue test*1 (3.0 kg/mm²)*2 | $1.0 \times 10^4$ | $0.5 \times 10^4$ | $4.7 \times 10^4$ | $3.2 \times 10^4$ | $0.5 \times 10^4$ | $2.3 \times 10^4$ | $0.2 \times 10^4$ | $0.1 \times 10^4$ |
| Tensile strength (kg/mm²) | 8.8 | 10.2 | 9.9 | 10.0 | 10.2 | 10.3 | 10.0 | 10.6 |
| Creep strength at break (kg/mm²) | 5.9 | 7.3 | 7.4 | 7.5 | 7.8 | 8.0 | 8.8 | 9.4 |
| Creep strength at break (%) | 67 | 72 | 75 | 75 | 76 | 78 | 88 | 89 |
| HDT (°C.)*3 | 220 | 216 | 213 | 210 | 212 | 208 | 170 | 158 |
| Kind of polyaryl-ether ketone | — | PEEK 450 P | PEKEKK A-1000 | PEK 220 | PEEK 450 P | PEKEKK A-1000 | PEEK 450 P | ← | note)
*1 Number of repetition until the specimen was broken.
*2 Stress
*3 HDT—Heat distortion temperature

Example 14

For 60 parts by weight of polyimide which was prepared from 4,4'-bis(3-aminophenoxy)biphenyl and pyromellitic dianhydride and had an inherent viscosity of 0.50 dl/g and 40 parts by weight of polyarylether ketone (PEEK 450 P; Trade Mark of I.C.I. Ltd.), 5 parts by weight of polyetherimide (ULTEM 1000; Trade Mark of G.E. Co.) was dry blended with a mixer, successively extruded through a twin screw extruder at 370°–420° C. While charging from a side feeder 43 parts by weight of carbon fiber for 100 parts by weight of the resin composition and cut into pellets. The pellets thus obtained were injection molded at cylinder temperature of 370°–410° C., injection pressure of 2300 kg/cm² and mold temperature of 160° C. to form test specimens.

Various properties were measured by these specimens. Test items, test methods and results are illustrated in Table 3.

Examples 15~18

Test specimens were prepared by carrying out the same procedures as described in Example 14 except that resin composition and carbon fiber illustrated in examples 15~18 in Table 3, were used.

Various properties were measured by these specimens. Test items, test methods and results are illustrated in Table 3.

Comparative Examples 9 and 10

Test specimens were prepared by carrying out the same procedures as described in Example 14 except that resin and carbon fiber illustrated in comparative examples 9 and 10 in Table 3, were used.

Various properties were measured by these specimens. Test items, test methods and results are illustrated in Table 3.

TABLE 3

|  | Example 14 | Example 15 | Example 16 | Example 17 | Example 18 | Compara. example 9 | Compara. example 10 |
|---|---|---|---|---|---|---|---|
| Composition (parts by weight) |  |  |  |  |  |  |  |
| Polyimide | 60 | 60 | 60 | 80 | 60 | 100 | — |
| Polyaryletherketone | 40 | 40 | 40 | 20 | 40 | — | 100 |
| Polyether imide | 5 | 15 | 25 | 15 | 15 | — | — |
| Carbon fiber*4 | 43 | 43 | 43 | 43 | 43 | 43 | 43 |
| Fatigue test*1 (12 kg/mm²)*2 | $0.9 \times 10^6$ | $1.0 \times 10^6$ | $1.5 \times 10^6$ | $1.0 \times 10^6$ | $3.0 \times 10^6$ | $1.0 \times 10^5$ | $1.0 \times 10^7$ unbroken |
| High temperature fatigue test*1 (10 kg/mm²)*2 | $3.0 \times 10^6$ | $4.5 \times 10^6$ | $4.1 \times 10^6$ | $2.0 \times 10^6$ | $8.0 \times 10^6$ | $0.1 \times 10^6$ | $0.05 \times 10^6$ |
| Tensile strength (kg/mm²) | 25.5 | 26.0 | 25.9 | 26.5 | 27.1 | 24.1 | 26.0 |
| Creep strength at break (kg/mm²) | 19.4 | 20.8 | 20.5 | 20.0 | 21.5 | 16.6 | 23.1 |

TABLE 3-continued

|  | Example 14 | Example 15 | Example 16 | Example 17 | Example 18 | Compara. example 9 | Compara. example 10 |
|---|---|---|---|---|---|---|---|
| Creep strength at break (%) | 76 | 80 | 79 | 75 | 79 | 69 | 89 |
| Tensile strength at 150° C. (kg/mm$^2$) | 13.9 | 14.1 | 14.1 | 14.1 | 13.6 | 15.0 | 11.5 |
| Kind of polyarylether ketone | PEEK 450 P | ← | ← | ← | ← | — | PEEK 450 P | note)
*[1]Number of repetitions until the specimen was broken.
*[2]Stress
*[3]HDT—Heat distortion temperature
*[4]Parts by weight for 100 parts by weight of resin composition

Example 19

For 60 parts by weight of polyimide which was prepared from 4,4'-bis(3-aminophenoxy)biphenyl and pyromellitic dianhydride and had an inherent viscosity of 0.50 dl/g and 40 parts by weight of polyarylether ketone (PEEK 450 P; Trade Mark of I.C.I. Ltd.), 15 parts by weight of polyetherimide (ULTEM 1000: Trade Mark of G.E. Co.) was dry blended with a mixer, successively extruded through a twin screw extruder at 370°~420° C. while charging from a side feeder 5 parts by weight of carbon fiber for 100 parts by weight of the resin composition and cut into pellets. The pellets thus obtained were injection molded at cylinder temperature of 370°~410° C., injection pressure of 2300 kg/cm$^2$ and mold temperature of 160° C. to form test specimens.

Various properties were measured by these specimens. Test items, test methods and results are illustrated in Table 4.

Examples 20~23

Test specimens were prepared by carrying out the same procedures as described in Example 19 except that carbon fiber illustrated in examples 20~23 in Table 4, were used.

Various properties were measured by these specimens. Test items, test methods and results are illustrated in Table 4.

TABLE 4

|  | Example 19 | Example 20 | Example 21 | Example 22 | Example 23 |
|---|---|---|---|---|---|
| Composition (parts by weight) | | | | | |
| Polyimide | 60 | 60 | 60 | 60 | 60 |
| Polyaryletherketone | 40 | 40 | 40 | 40 | 40 |
| Polyether imide | 15 | 15 | 15 | 15 | 15 |
| Carbon fiber*[4] | 5 | 43 | 65 | — | 85 |
| Fatigue test*[1] (12 kg/mm$^2$)*[2] | $8.0 \times 10^3$ | $1.0 \times 10^6$ | $1.0 \times 10^7$ unbroken | broke in early stage of test | Poor flowability |
| High temperature fatigue test*[1] (8 kg/mm$^2$)*[2] | $1.0 \times 10^4$ | $1.0 \times 10^7$ unbroken | $1.0 \times 10^7$ unbroken | broke in early stage of test | |
| Tensile strength (kg/mm$^2$) | 15.0 | 26.0 | 29.0 | 11.5 | |
| Creep strength at break (kg/mm$^2$) | 12.0 | 20.8 | 23.2 | 9.2 | |
| Creep strength at break (%) | 80 | 80 | 80 | 80 | |
| Tensile strength at 150° C. (kg/mm$^2$) | 8.3 | 14.1 | 15.3 | 6.2 | |
| Kind of polyarylether ketone | PEEK 450 P | ← | ← | ← | ← | note)
*[1]Number of repetitions until the specimen was broken.
*[2]Stress
*[3]HDT—Heat distortion temperature
*[4]Parts by weight for 100 parts by weight of resin composition

Example 24

For 80 parts by weight of polyimide which was prepared from 1,3-bis(3-aminophenoxy)benzene and pyromellitic dianhydride in the presence of phthalic anhydride as endcapping agent and had an inherent viscosity of 0.65 dl/g and 20 parts by weight of polyarylether ketone (PEEK 450 P; Trade Mark of I.C.I. Ltd.), 5 parts by weight of polyetherimide (ULTEM 1000; Trade Mark of G.E. Co.) was dry blended with a mixer, successively extruded through a twin screw extruder at 370°–400° C. and cut into pellets. The pellets thus obtained were injection molded at cylinder temperature of 370°–410° C., injection pressure of 900 kg/cm² and mold temperature of 160° C. to form test specimens.

Various properties were measured by these specimens. Test items, test methods and results are illustrated in Table 5.

Examples 25~32

Test specimens were prepared by carrying out the same procedures as described in Example 24 except that compositions illustrated in comparative example 25~32 in Table 5, were used.

Various properties were measured by these specimens. Test items, test methods and results are illustrated in Table 5.

Example 35

Test specimens obtained in Example 34 were heat-treated for 4 hours at 220° C.

Various properties were measured by these specimens. Test items, test methods and results are illustrated in Table 6.

Example 36

For 60 parts by weight of polyimide which was prepared from 1,3-bis(3-aminophenoxy)benzene and pyromellitic dianhydride in the presence of aniline as end-capping agent and had an inherent viscosity of 0.65 dl/g and 40 parts by weight of polyarylether ketone (PEKEKK) (ULTAR PEK A-1000; Trade Mark of B.A.S.F.), 10 parts by weight of polyetherimide (ULTEM 1000: Trade Mark of G.E. Co.) was dry blended with a mixer, successively extruded

TABLE 5

|  | Example 24 | Example 25 | Example 26 | Example 27 | Example 28 | Example 29 | Example 30 | Example 31 | Example 32 |
|---|---|---|---|---|---|---|---|---|---|
| Composition (parts by weight) | | | | | | | | | |
| Polyimide | 80 | 80 | 80 | 60 | 60 | 60 | 60 | 60 | 60 |
| Polyaryletherketone | 20 | 20 | 20 | 40 | 40 | 40 | 40 | 40 | 40 |
| Polyetherimide | 5 | 10 | 25 | 2 | 5 | 10 | 20 | 25 | 43 |
| Carbon fiber | — | — | — | — | — | — | — | — | — |
| Fatigue test*¹ (5.5 kg/mm²)*² | $4.8 \times 10^5$ | $5.0 \times 10^5$ | $4.6 \times 10^5$ | $5.0 \times 10^5$ | $7.0 \times 10^5$ | $7.9 \times 10^5$ | $9.8 \times 10^5$ | $9.5 \times 10^5$ | $5.2 \times 10^5$ |
| High temperature fatigue test*¹ (3.0 kg/mm²)*² | $1.0 \times 10^5$ | $2.3 \times 10^5$ | $1.6 \times 10^5$ | $0.5 \times 10^5$ | $0.9 \times 10^5$ | $2.6 \times 10^5$ | $3.6 \times 10^5$ | $4.2 \times 10^5$ | $1.1 \times 10^5$ |
| Tensile strength (kg/mm²) | 11.8 | 11.9 | 11.7 | 11.8 | 12.0 | 12.2 | 12.6 | 12.6 | 12.3 |
| Creep strength at break (kg/mm²) | 9.4 | 9.5 | 9.9 | 9.4 | 9.8 | 10.2 | 11.0 | 11.2 | 10.5 |
| Creep strength at break (%) | 80 | 80 | 85 | 80 | 82 | 84 | 87 | 89 | 85 |
| HDT (°C.) | 223 | 220 | 220 | 218 | 216 | 214 | 214 | 215 | 213 |
| Heat treatment | non treated | ← | ← | ← | ← | ← | ← | ← | ← |
| Kind of polyarylether ketone | PEEK 450 P | ← | ← | ← | ← | ← | ← | ← | ← | note)
*¹Number of repetitions until the specimen was broken.
*²Stress
*³HDT—Heat distortion temperature Example 33

Test specimens were prepared by carrying out the same procedures as described in Example 24 except that composition illustrated in example 33 in Table 6 and PEKEKK (ULTRA PEK A 1000; Trade Mark of B.A.S.F.) as polyarylether ketone, were used.

Various properties were measured by these specimens. Test items, test methods and results are illustrated in Table 6.

Example 34

Test specimens were prepared by carrying out the same procedures as described in Example 24 except that composition illustrated in example 33 in Table 6 and PEK (PEK 220; Trade Mark of I.C.I. Ltd.) as polyarylether ketone, were used.

Various properties were measured by these specimens. Test items, test methods and results are illustrated in Table 6.

through a twice screw extruder at 370°–400° C. and cut in to pellets. The pellets thus obtained were injection molded at cylinder temperature of 370°–410° C., injection pressure of 900 kg/cm² and mold temperature of 160° C. to form test specimens.

Various properties were measured by these specimens. Test items, test methods and results are illustrated in Table 6.

Example 37

Test specimens obtained in Example 36 were heat-treated for 4 hours at 220° C.

Various properties were measured by these specimens. Test items, test methods and results are illustrated in Table 6.

TABLE 6

|  | Example 33 | Example 34 | Example 35 | Example 36 | Example 37 |
|---|---|---|---|---|---|
| Composition (parts by weight) | | | | | |
| Polyimide | 60 | 60 | 60 | 60 | 60 |
| Polyaryletherketone | 40 | 40 | 40 | 40 | 40 |
| Polyetherimide | 10 | 10 | 10 | 10 | 10 |
| Carbon fiber | — | — | — | — | — |
| Fatigue test*[1] (5.5 kg/mm$^2$)*[2] | $60.0 \times 10^5$ | $49.8 \times 10^5$ | $88.9 \times 10^5$ | $49.2 \times 10^5$ | $80.9 \times 10^5$ |
| High temperature fatigue test*[1] (3.0 kg/mm$^2$)*[2] | $8.0 \times 10^5$ | $10.0 \times 10^5$ | $60.3 \times 10^5$ | $6.7 \times 10^5$ | $33.4 \times 10^5$ |
| Tensile strength (kg/mm$^2$) | 11.5 | 11.3 | 13.1 | 11.2 | 12.9 |
| Creep strength at break (kg/mm$^2$) | 10.4 | 10.1 | 12.2 | 10.0 | 12.0 |
| Creep strength at break (%) | 90 | 89 | 93 | 89 | 93 |
| HDT (°C.)*[3] | 220 | 219 | 220 | 219 | 220 |
| Heat treatment | non treated | ← | treated | non treated | treated |
| Kind of polyarylether ketone | PEKEKK A-1000 | PEK 220 | ← | PEKEKK A-1000 | ← | note)
*[1]Number of repetitions until the specimen was broken.
*[2]Stress
*[3]HDT—Heat distortion temperature

Comparative Example 11

Polyimide which was prepared from 1,3-bis(3-aminophenoxy)benzene and pyromellitic dianhydride in the presence of phthalic anhydride as end capping agent and had an inherent viscosity of 0.65 dl/g extruded through a twin screw extruder at 370°–400° C. and cut into pellets. The pellets thus obtained were injection molded at cylinder temperature of 370°–410° C., injection pressure of 900 kg/cm$^2$ and mold temperature of 160° C. to form test specimens.

Various properties were measured by these specimens. Test items, test methods and results are illustrated in Table 7.

Comparative Examples 12–15

Test specimens were prepared by carrying out the same procedures as described in Example 24 except that composition illustrated in comparative examples 12–15 in Table 7 and PEEK (PEEK 450 P; Trade Mark of I.C.I. Ltd.) as polyarylether ketone, are used.

Various properties were measured by these specimens. Test items, test methods and results are illustrated in Table 7.

Comparative Example 16

Test specimens were prepared by carrying out the same procedures as described in Example 24 except that composition illustrated in comparative example 16 in Table 7 and PEKEKK (ULTRA PEK A-1000; Trade Mark of B.A.S.F.) as polyarylether ketone, are used.

Various properties were measured by these specimens. Test items, test methods and results are illustrated in Table 7.

Comparative Example 17

Test specimens were prepared by carrying out the same procedures as described in Example 24 except that composition illustrated in comparative example 17 in Table 7 and PEK (PEK 220; Trade Mark of I.C.I. Ltd.) as polyarylether ketone, are used.

Various properties were measured by these specimens. Test items, test methods and results are illustrated in Table 7.

Comparative Example 18

Polyarylketone (PEEK 450 P; Trade mark; I.C.I. Ltd.) extruded through a twice screw extruder at 370°–400° C. and cut into pellets. The pellets thus obtained were injection molded at cylinder temperature of 360°–380° C., injection pressure of 900 kg/cm$^2$ and mold temperature of 160° C. to form test specimens.

Various properties were measured by these specimens. Test items, test methods and results are illustrated in Table 7.

TABLE 7

|  | Comparative example 11 | Compara. example 12 | Compara. example 13 | Compara. example 14 | Compara. example 15 | Compara. example 16 | Compara. example 17 | Compara. example 18 |
|---|---|---|---|---|---|---|---|---|
| Composition (parts by weight) | | | | | | | | |
| Polyimide | 100 | 80 | 60 | 60 | 30 | 60 | 60 | — |

TABLE 7-continued

|  | Comparative example 11 | Compara. example 12 | Compara. example 13 | Compara. example 14 | Compara. example 15 | Compara. example 16 | Compara. example 17 | Compara. example 18 |
|---|---|---|---|---|---|---|---|---|
| Polyaryletherketone | — | 20 | 40 | 40 | 70 | 40 | 40 | 100 |
| Polyetherimide | — | — | — | 80 | 10 | — | — | — |
| Carbon fiber | — | — | — | — | — | — | — | — |
| Fatigue test*1 (5.5 kg/mm$^2$)*2 | $0.7 \times 10^5$ | $1.0 \times 10^5$ | $2.0 \times 10^5$ | $0.9 \times 10^5$ | $9.9 \times 10^5$ | $7.1 \times 10^5$ | $8.0 \times 10^5$ | $1.0 \times 10^7$ unbroken |
| High temperature fatigue test*1 (3.0 kg/mm$^2$)*2 | $3.0 \times 10^4$ | $1.0 \times 10^4$ | $0.5 \times 10^4$ | $8.0 \times 10^4$ | $0.2 \times 10^4$ | $10.0 \times 10^4$ | $12.0 \times 10^4$ | $0.1 \times 10^4$ |
| Tensile strength (kg/mm$^2$) | 9.2 | 10.1 | 10.7 | 10.7 | 10.2 | 10.9 | 10.8 | 10.6 |
| Creep strength at break (kg/mm$^2$) | 6.3 | 7.4 | 8.1 | 7.6 | 9.1 | 9.5 | 9.2 | 9.4 |
| Creep strength at break (%) | 69 | 73 | 76 | 71 | 89 | 87 | 85 | 89 |
| HDT (°C.)*3 | 220 | 222 | 215 | 209 | 178 | 218 | 217 | 158 |
| Heat treatment | non treated | ← | ← | ← | ← | ← | ← | ← |
| Kind of polyarylether ketone | — | PEEK 450 P | ← | ← | ← | PEKEKK A-1000 | PEK 220 | PEEK 450 P | note)
*1Number of repetitions until the specimen was broken.
*2Stress
*3HDT—Heat distortion temperature

Example 38

For 60 parts by weight of polyimide which was prepared from 1,3-bis(3-aminophenoxy)benzene and pyromellitic dianhydride in the presence of phthalic anhydride as end-capping agent and had an inherent viscosity of 0.65 dl/g and 40 parts by weight of polyarylether ketone (PEEK 450 P; Trade Mark of I.C.I.Ltd.), 5 parts by weight of polyetherimide (ULTEM 1000; Trade Mark of G.E. Co.) was dry blended with a mixer, successively extruded through a twin screw extruder at 370°–420° C. While charging from a side feeder 43 parts by weight of carbon fiber for 100 parts by weight of the resin composition and cut into pellets. The pellets thus obtained were injection molded at cylinder temperature of 370°–410° C., injection pressure of 2300 kg/cm$^2$ and mold temperature of 160° C. to form test specimens.

Various properties were measured by these specimens. Test items, test methods and results are illustrated in Table 8.

Examples 39–40

Composition of examples 39–40 illustrated in Table 8 was dryblended respectively and successively extruded through a twin screw extruder at 370°–420° C. while charging from a side feeder 43 parts by weight of carbon fiber for 100 parts by weight of the resin composition and cut into pellets. The pellets thus obtained were injection molded at cylinder temperature of 370°–410° C., injection pressure of 2300 kg/cm$^2$ and mold temperature of 160° C. to form test specimens.

Various properties were measured by these specimens. Test items, test methods and results are illustrated in Table 8.

Example 41

For 80 parts by weight of polyimide which was prepared from 1,3-bis(3-aminophenoxy)benzene and pyromellitic dianhydride in the presence of phthalic anhydride as end-capping agent and had an inherent viscosity of 0.65 dl/g and 20 parts by weight of polyarylether ketone (PEEK 450 P; Trade Mark of I.C.I. Ltd.), 15 parts by weight of polyetherimide (ULTEM 1000: Trade Mark of G.E. Co.) was dry blended with a mixer, successively extruded through a twin screw extruder at 370°–420° C. while charging from a side feeder 43 parts by weight of carbon fiber for 100 parts by weight of the resin composition and cut into pellets. The pellets thus obtained were injection molded at cylinder temperature of 370°–410° C., injection pressure of 2300 kg/cm$^2$ and mold temperature of 160° C. to form test specimens.

The test specimens obtained above were heat-treated for 4 hours at 220° C.

Various properties were measured by these specimens. Test items, test methods and results are illustrated in Table 8.

Example 42

Test specimens were prepared by carrying out the same procedures as described in Example 41 except that composition illustrated in example 42 in Table 8 and PEK (PEK 220; Trade Mark of I.C.I. Ltd.) as polyarylether ketone, are used.

Various properties were measured by these specimens. Test items, test methods and results are illustrated in Table 8.

Example 43

Test specimens were prepared by carrying out the same procedures as described in Example 41 except that composition illustrated in example 43 in Table 8 and PEKEKK (ULTRA PEK A 1000; Trade Mark of B.A.S.F.) as polyarylether ketone, are used.

Various properties were measured by these specimens. Test items, test methods and results are illustrated in Table 8.

Example 44

Test specimens obtained in Example 38 were heat-treated for 4 hours at 220° C.

Various properties were measured by these specimens. Test items, test methods and results are illustrated in Table 8.

TABLE 8

|  | Example 38 | Example 39 | Example 40 | Example 41 | Example 42 | Example 43 | Example 44 |
|---|---|---|---|---|---|---|---|
| Composition (parts by weight) | | | | | | | |
| Polyimide | 60 | 60 | 60 | 80 | 80 | 80 | 60 |
| Polyarylether- ketone | 40 | 40 | 40 | 20 | 20 | 20 | 40 |
| Polyetherimide | 5 | 15 | 25 | 15 | 15 | 15 | 15 |
| Carbon fiber*4 | 43 | 43 | 43 | 43 | 43 | 43 | 43 |
| Fatigue test*1 (12 kg/mm$^2$)*2 | $0.08 \times 10^7$ | $0.1 \times 10^7$ | $0.8 \times 10^7$ | $0.6 \times 10^7$ | $1.0 \times 10^7$ unbroken | $1.0 \times 10^7$ ← | $0.7 \times 10^7$ |
| High temperature fatigue test*1 (10 kg/mm$^2$)*2 | $9.0 \times 10^6$ | $1.0 \times 10^7$ unbroken | $1.0 \times 10^7$ ← | $1.0 \times 10^7$ ← | $1.0 \times 10^7$ ← | $1.0 \times 10^7$ ← | $1.0 \times 10^7$ ← |
| Tensile strength (kg/mm$^2$) | 26.9 | 27.1 | 27.7 | 28.2 | 29.1 | 30.1 | 28.9 |
| Creep strength at break (kg/mm$^2$) | 22.9 | 23.8 | 24.7 | 24.0 | 25.9 | 26.5 | 26.0 |
| Creep strength at break (%) | 85 | 88 | 89 | 85 | 89 | 88 | 90 |
| Tensile strength at 150° C. (kg/mm$^2$) | 13.3 | 13.8 | 14.3 | 14.5 | 15.1 | 15.2 | 14.1 |
| Heat treatment | non treated | ← | ← | treated | ← | ← | ← |
| Kind of polyaryl- ether ketone | PEEK 450 P | ← | ← | ← | PEK 220 | PEKEKK A-1000 | PEEK 450 P | note)
*1Number of repetitions until the specimen was broken.
*2Stress
*3HDT—Heat distortion temperature
*4Parts by weight for 100 parts by weight of resin composition Comparative Example 19

Polyimide which was prepared from 1,3-bis(3-aminophenoxy)benzene and pyromellitic dianhydride in the presence of phthalic anhydride as end-capping agent and had an inherent viscosity of 0.65 dl/g extruded through a twin screw extruder at 370°~420° C. while charging from a side feeder 43 parts by weight of carbon fiber for 100 parts by weight of the resin composition and cut into pellets. The pellets thus obtained were injection molded at cylinder temperature of 370°~410° C., injection pressure of 2300 kg/cm$^2$ and mold temperature of 160° C. to form test specimens.

Various properties were measured by these specimens. Test items, test methods and results are illustrated in Table 9.

Comparative Example 20

Test specimens obtained in comparative example 19 were heat-treated for 4 hours at 220° C.

Various properties were measured by these specimens. Test items, test methods and results are illustrated in Table 9.

Comparative Example 21

Polyarylether ketone (PEEK 450 CF 30 weight % pellet; Trade mark: I.C.I. Ltd.) were injection molded at cylinder temperature of 370°~410° C., injection pressure of 2300 kg/cm$^2$ and mold temperature of 180° C. to form test specimens.

Various properties were measured by these specimens. Test items, test methods and results are illustrated in Table 9.

TABLE 9

|  | Comparative example 19 | Compara. example 20 | Compara. example 21 |
|---|---|---|---|
| Composition (parts by weight) | | | |
| Polyimide | 100 | 100 | — |
| Polyarylether- ketone | — | — | 100 |
| Polyetherimide | — | — | — |
| Carbon fiber*4 | 43 | 43 | 43 |
| Fatigue test*1 (12 kg/mm$^2$)*2 | $4.0 \times 10^4$ | $4.0 \times 10^4$ | $1.0 \times 10^7$ unbroken |
| High temperature fatigue test*1 (10 kg/mm$^2$)*2 | $0.3 \times 10^6$ | $0.3 \times 10^6$ | $0.05 \times 10^6$ |
| Tensile strength (kg/mm$^2$) | 24.9 | 24.9 | 26.0 |
| Creep strength at break (kg/mm$^2$) | 17.2 | 17.2 | 23.1 |
| Creep strength at break (%) | 69 | 69 | 89 |
| Tensile strength at 150° C. (kg/mm$^2$) | 15.3 | 15.3 | 11.5 |
| Heat treatment | non treated | treated | non treated |
| Kind of polyaryl- ether ketone | — | — | PEEK 450 P | note)
*1Number of repetitions until the specimen was broken.
*2Stress.
*3HDT—Heat distortion temperature
*4Parts by weight for 100 parts by weight of resin composition Example 45

For 60 parts by weight of polyimide which was prepared from 1,3-bis(3-aminophenoxy)benzene and pyromellitic dianhydride in the presence of phthalic anhydride as end-capping agent and had an inherent viscosity of 0.65 dl/g and 40 parts by weight of polyarylether ketone (PEEK 450 P; Trade Mark of I.C.I. Ltd.), 15 parts by weight of polyetherimide (ULTEM 1000: Trade Mark of G.E. Co.) was dry blended with a mixer, successively extruded through a twin screw extruder at 370°–420° C. while charging from a side feeder 5 parts by weight of carbon fibers for 100 parts by weight of the resin composition and cut into pellets. The pellets thus obtained were injection molded at cylinder temperature of 370°–410° C., injection pressure of 2300 kg/cm² and mold temperature of 160° C. to form test specimens.

Various properties were measured by these specimens. Test items, test methods and results are illustrated in Table 10.

Examples 46–49

Test specimens were prepared by carrying out the same procedures as described in Example 45 except that carbon fibers illustrated in examples 46–49 in Table 10, were used.

Various properties were measured by these specimens. Test items, test methods and results are illustrated in Table 10.

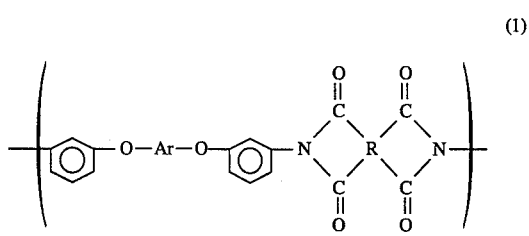

(1)

wherein Ar is

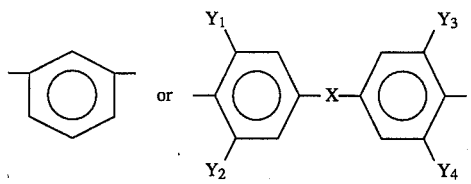

wherein X is one or more radicals selected from the group consisting of a direct bond, divalent hydrocarbon radical having 1~10 carbon atoms, hexafluorinated isopropylidene, carbonyl, thio, sulfonyl and ether radical, and $Y_1$, $Y_2$, $Y_3$,

TABLE 10

|  | Example 45 | Example 46 | Example 47 | Example 48 | Example 49 |
|---|---|---|---|---|---|
| Composition (parts by weight) | | | | | |
| Polyimide | 60 | 60 | 60 | 60 | 60 |
| Polyaryletherketone | 40 | 40 | 40 | 40 | 40 |
| Polyetherimide | 15 | 15 | 15 | 15 | 15 |
| Carbon fiber*[4] | 5 | 43 | 65 | — | 85 |
| Fatigue test*[1] (12 kg/mm²)*[2] | $5.0 \times 10^4$ | $1.0 \times 10^6$ | $1.0 \times 10^7$ unbroken | broke in early stage of test | poor flowability |
| High temperature fatigue test*[1] (8 kg/mm²)*[2] | $7.0 \times 10^5$ | $1.0 \times 10^7$ unbroken | $1.0 \times 10^7$ unbroken | broke in early stage of test | |
| Tensile strength (kg/mm²) | 16.3 | 27.1 | 29.9 | 12.4 | |
| Creep strength at break (kg/mm²) | 14.0 | 23.8 | 27.5 | 10.5 | |
| Creep strength at break (%) | 86 | 88 | 92 | 85 | |
| Tensile strength at 150° C. (kg/mm²) | 9.2 | 13.8 | 15.9 | 7.5 | |
| Heat treatment | non treated | ← | ← | ← | |
| Kind of polyarylether ketone | PEEK 450 P | ← | ← | ← | ← | note)
*[1]Number of repetitions until the specimen was broken.
*[2]Stress.
*[3]HDT—Heat distortion temperature
*[4]Parts by weight for 100 parts by weight of resin composition

What is claimed is:

1. A polyimide based resin composition having good resistance to fatigue and creep, comprising 1~50 parts by weight of polyetherimide for 100 parts by weight of a resin composition comprised of 50~1 parts by weight of polyarylether ketone and 50~99 parts by weight of a polyimide having recurring structural units represented by the formula (1):

and $Y_4$ are individually one or more radicals selected from the group consisting of a halogen atom, lower alkyl radical, lower alkoxy radical, chlorine atom and bromine atom; and R is a tetravalent radical selected from the group consisting of an aliphatic radical having 4~9 carbon atoms, monocyclic aliphatic radical having 4~10 carbon atoms, monoaromatic radical, condensed polyaromatic radical, and noncondensed aromatic radical connected to each other with a direct bond or a bridge member and wherein the polyimide is different from the polyetherimide.

2. A polyimide based resin composition comprising 1~50 parts by weight of polyetherimide for 100 parts by weight of a resin comprising comprised of 50~5 parts by weight of polyarylether ketone and 50~95 parts by weight of a polyimide having recurring structural units represented by the formula (2):

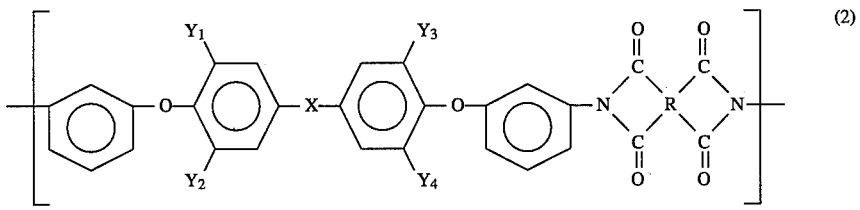

wherein X is one or more radicals selected from the group consisting of a direct bond, divalent hydrocarbon radical having 1~10 carbon atoms, hexafluorinated isopropylidene, carbonyl, thio, sulfonyl and ether radical, and $Y_1$, $Y_2$, $Y_3$ and $Y_4$ are individually one or more radicals selected from the group consisting of a halogen atom, lower alkyl radical, lower alkoxy radical, chlorine atom and bromine atom; and R is a tetravalent radical selected from the group consisting of an aliphatic radical having 4~9 carbon atoms, monocyclic aliphatic radical having 4~10 carbon atoms, monoaromatic radical, condensed polyaromatic radical, and noncondensed aromatic radical connected to each other with a direct bond or a bridge member and wherein the polyimide is different from the polyetherimide.

3. A polyimide based resin composition comprising 1~50 parts by weight of polyetherimide for 100 parts by weight of a resin composition comprised of 50~1 parts by weight of polyarylether ketone and 50~99 parts by weight of a polyimide having recurring structural units represented by the formula (3):

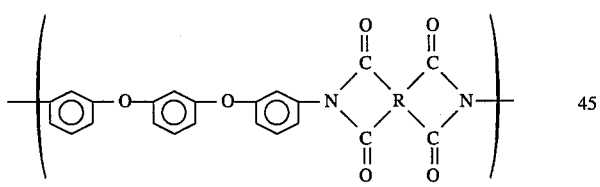 (3)

wherein R is a tetravalent radical selected from the group consisting of an aliphatic radical having 4~9 carbon atoms, monocyclic aliphatic radical having 4~10 carbon atoms, monoaromatic radical, condensed polyaromatic radical, and noncondensed aromatic radical connected to each other with a direct bond or a bridge member and wherein the polyimide is different from the polyetherimide.

4. A polyimide based resin composition of claim 1, 2 or 3 wherein the amount of the polyetherimide is 5~25 parts by weight for 100 parts of the resin composition comprising polyimide and polyarylether ketone.

5. A polyimide based resin composition of claim 1, 2 or 3 wherein the amount of the polyetherimide is 10~20 parts by weight for 100 parts of the resin composition comprising polyimide and polyarylether ketone.

6. A polyimide based resin composition of claim 1, 2 or 3 wherein the polyimide comprises an end-capped polymer obtained by preparing said polyimide in the presence of aromatic anhydride represented by the formula (4):

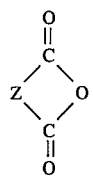 (4)

wherein Z is a divalent radical having 6~15 carbon atoms and being selected from the group consisting of a monoaromatic radical, condensed polyaromatic radical and noncondensed aromatic radical connected to each other with a direct bond or a bridge member, and/or aromatic monoamine represented by the formula (5):

V—NH$_2$ (5)

wherein V is a monovalent radical having 6~15 carbon atoms and being selected from the group consisting of a monoaromatic radical, condensed polyaromatic radical and noncondensed aromatic radical connected to each other with a direct bond or a bridge member.

7. A polyimide based resin composition of claim 1, 2 or 3 wherein the polyarylether ketone has a least one recurring structural unit selected from the group consisting of from formula (6) to formula (10):

(6)

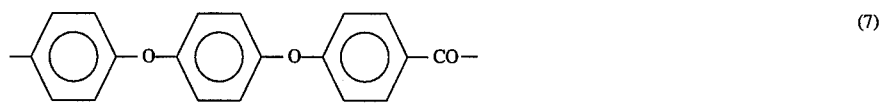
(7)

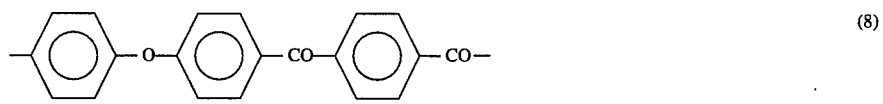
(8)

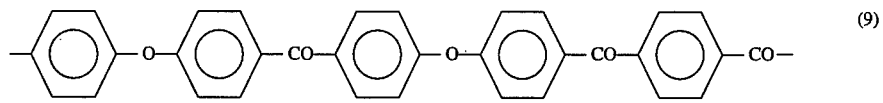
(9)

and

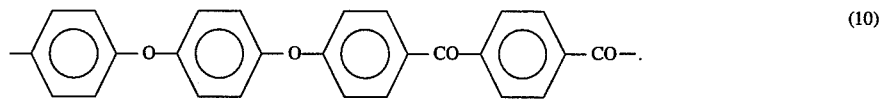
(10)

8. A polyimide based resin composition of claim 1, 2 or 3 wherein the polyetherimide has a recurring structural unit represented by the formula (11):

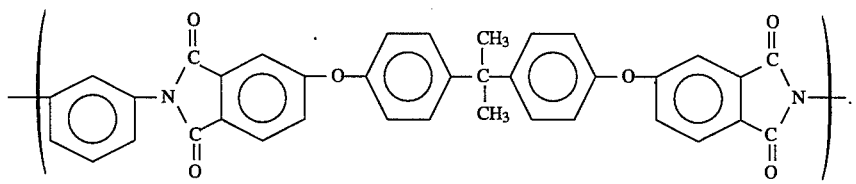
(11)

9. A polyimide based resin composition of claim 1, 2 or 3 wherein the composition is improved their permanence properties by heat treating at temperature of from 150° C. to 370° C.

10. A polyimide based resin composition comprises 5 to 65 parts by weight of fibrous reinforcements for 100 parts by weight of the polyimide based resin composition of claim 1, 2 or 3.

11. An injection molded article obtained from the polyimide based resin composition of claim 1, 2 or 3.

* * * * *

UNITED STATES PATENT AND TRADEMARK OFFICE
CERTIFICATE OF CORRECTION

PATENT NO. : 5,473,010

DATED: : December 5, 1995

INVENTOR(S) : Atsushi MORITA et al

It is certified that error appears in the above-identified patent and that said Letters Patent is hereby corrected as shown below:

Column 41, line 41
In claim 9, line 2, delete "their" and insert therefor --in--.
Column 41, line 44
In claim 10, line 1, delete "comprises" and insert therefor --comprising--.

Signed and Sealed this

Twenty-fourth Day of September, 1996

*Attest:*

BRUCE LEHMAN

*Attesting Officer*   *Commissioner of Patents and Trademarks*